(12) United States Patent
Ziaja et al.

(10) Patent No.: US 9,886,598 B2
(45) Date of Patent: Feb. 6, 2018

(54) AUTOMATIC ADJUSTMENT OF A DISPLAY TO OBSCURE DATA

(71) Applicant: PAYPAL INC., San Jose, CA (US)

(72) Inventors: Jason Ziaja, Cedar Park, TX (US); Bryant Genepang Luk, Round Rock, TX (US); Christopher Diebold O'Toole, Cedar Park, TX (US); Jennifer T. Brenner, Austin, TX (US); Robert He, Pflugerville, TX (US); Yu Tang, Round Rock, TX (US); Ananya Das, Austin, TX (US)

(73) Assignee: PAYPAL, INC., San Jose, CA (US)

( * ) Notice: Subject to any disclaimer, the term of this patent is extended or adjusted under 35 U.S.C. 154(b) by 31 days.

(21) Appl. No.: 14/584,335

(22) Filed: Dec. 29, 2014

(65) Prior Publication Data
US 2016/0188973 A1    Jun. 30, 2016

(51) Int. Cl.
G06F 21/84    (2013.01)
G06F 3/01    (2006.01)
G06F 21/62    (2013.01)

(52) U.S. Cl.
CPC .............. *G06F 21/84* (2013.01); *G06F 3/013* (2013.01); *G06F 21/62* (2013.01); *G06F 2221/2111* (2013.01)

(58) Field of Classification Search
CPC .......... G06F 3/013; G06F 21/50; G06F 21/84; G06F 3/017
See application file for complete search history.

(56) References Cited

U.S. PATENT DOCUMENTS

| | | |
|---|---|---|
| 5,936,596 A | 8/1999 | Yoshida |
| 6,243,060 B1 | 6/2001 | Natori |
| 6,288,741 B1 | 9/2001 | Trevijano |
| 6,633,306 B1 | 10/2003 | Marz et al. |
| 6,765,550 B2 | 7/2004 | Janick |
| 7,134,130 B1 | 11/2006 | Thomas |
| 8,922,480 B1 | 12/2014 | Freed et al. |
| 9,069,519 B1 | 6/2015 | Hall |
| 9,318,041 B2 | 4/2016 | Kawabata et al. |

(Continued)

OTHER PUBLICATIONS

International Searching Authority, Search Report and Written Opinion of the International Searching Authority for PCT/US2015/063453, dated Feb. 25, 2016, 8 pages.

(Continued)

*Primary Examiner* — Stephen R Koziol
*Assistant Examiner* — Shaghayegh Azima
(74) *Attorney, Agent, or Firm* — Haynes and Boone LLP

(57) ABSTRACT

Methods, systems, and computer program products are disclosed for automatically adjusting a display to obscure application data. In an example, a computer-implemented method may include collecting eye data from a user, receiving the eye data collected from the user, analyzing the eye data, determining that eyesight of the user is on a display based on the eye data, providing data on the display to the user when the eyesight of the user is determined to be on the display, determining that the eyesight of the user is off the display, obscuring the data on the display in response to determining that the eyesight of the user is off the display, removing the obscuring applied to the data on the display when the eyesight of the user returns to the display.

20 Claims, 4 Drawing Sheets

(56) References Cited

U.S. PATENT DOCUMENTS

| | | | |
|---|---|---|---|
| 9,355,612 B1* | 5/2016 | Shepard | G09G 5/006 |
| 9,552,752 B1 | 1/2017 | Perut | |
| 2001/0028430 A1 | 10/2001 | Koma | |
| 2002/0033923 A1 | 3/2002 | Shimoshikiryou et al. | |
| 2002/0149598 A1 | 10/2002 | Greier et al. | |
| 2002/0158967 A1 | 10/2002 | Janick et al. | |
| 2003/0038924 A1 | 2/2003 | Veligdan et al. | |
| 2003/0043313 A1 | 3/2003 | Minoura | |
| 2005/0099573 A1 | 5/2005 | Kubo et al. | |
| 2005/0235217 A1* | 10/2005 | Hoe-Richardson | G06F 21/84 |
| | | | 715/768 |
| 2006/0056626 A1 | 3/2006 | Keohane | |
| 2006/0126156 A1 | 6/2006 | Evans et al. | |
| 2006/0197739 A1 | 9/2006 | Kastalsky | |
| 2006/0238664 A1 | 10/2006 | Uehara et al. | |
| 2007/0040780 A1 | 2/2007 | Gass et al. | |
| 2007/0040975 A1 | 2/2007 | Momoi | |
| 2007/0222915 A1 | 9/2007 | Niioka et al. | |
| 2008/0107274 A1 | 5/2008 | Worthy | |
| 2008/0143755 A1 | 6/2008 | Sung et al. | |
| 2008/0284843 A1 | 11/2008 | Jo | |
| 2009/0096710 A1 | 4/2009 | Raman et al. | |
| 2009/0115943 A1 | 5/2009 | Gaides | |
| 2009/0242142 A1 | 10/2009 | Bellwood et al. | |
| 2010/0085517 A1 | 4/2010 | Hong | |
| 2010/0124363 A1 | 5/2010 | Ek et al. | |
| 2010/0149459 A1 | 6/2010 | Yabuta et al. | |
| 2010/0220043 A1 | 9/2010 | Broughton et al. | |
| 2011/0001712 A1 | 1/2011 | Saito | |
| 2011/0018860 A1 | 1/2011 | Parry et al. | |
| 2011/0058115 A1 | 3/2011 | Matsushima et al. | |
| 2011/0173438 A1 | 7/2011 | Matzkel | |
| 2011/0203745 A1 | 8/2011 | Abreu | |
| 2012/0013610 A1 | 1/2012 | Chae | |
| 2012/0050342 A1 | 3/2012 | Huang et al. | |
| 2012/0050651 A1 | 3/2012 | Huang et al. | |
| 2012/0168070 A1 | 7/2012 | Nelson et al. | |
| 2012/0300046 A1* | 11/2012 | Blayvas | G02B 27/0093 |
| | | | 348/54 |
| 2013/0076673 A1* | 3/2013 | Sirpal | G06F 3/1438 |
| | | | 345/173 |
| 2013/0083999 A1* | 4/2013 | Bhardwaj | G06Q 30/0643 |
| | | | 382/165 |
| 2013/0300648 A1* | 11/2013 | Kim | G06F 3/011 |
| | | | 345/156 |
| 2014/0029810 A1* | 1/2014 | Barr | G06K 9/00295 |
| | | | 382/118 |
| 2014/0108791 A1 | 4/2014 | Sinclair | |
| 2014/0118423 A1 | 5/2014 | Hasegawa et al. | |
| 2014/0146069 A1 | 5/2014 | Tan et al. | |
| 2014/0201844 A1* | 7/2014 | Buck | G06F 21/50 |
| | | | 726/26 |
| 2014/0254927 A1* | 9/2014 | Bhardwaj | G06Q 30/0643 |
| | | | 382/165 |
| 2014/0337175 A1* | 11/2014 | Katzin | G06Q 20/204 |
| | | | 705/26.62 |
| 2015/0009563 A1 | 1/2015 | Lauters et al. | |
| 2015/0058941 A1 | 2/2015 | Lyman | |
| 2015/0070386 A1* | 3/2015 | Ferens | G06F 3/011 |
| | | | 345/633 |
| 2015/0085251 A1* | 3/2015 | Larsen | G06K 9/00604 |
| | | | 351/206 |
| 2015/0109674 A1 | 4/2015 | Cok | |
| 2015/0235609 A1 | 8/2015 | Hall | |
| 2015/0249673 A1* | 9/2015 | Niemoeller | H04W 4/001 |
| | | | 726/4 |
| 2016/0071448 A1 | 3/2016 | Schwarz et al. | |
| 2016/0098692 A1 | 4/2016 | Johnson et al. | |
| 2016/0098700 A1 | 4/2016 | Johnson et al. | |
| 2016/0098709 A1 | 4/2016 | Johnson et al. | |
| 2016/0210473 A1 | 7/2016 | Cohen et al. | |
| 2016/0300081 A1 | 10/2016 | Weksler et al. | |
| 2016/0345001 A1 | 11/2016 | Baek et al. | |
| 2016/0351539 A1 | 12/2016 | Bower et al. | |
| 2017/0082894 A1 | 3/2017 | Katsuta et al. | |

OTHER PUBLICATIONS

Eyetracking, Inc., "About Us: What is Eyetracking?"; Solana Beach, CA 92075, USA, www.eyetracking.com, 2011, 2 pages.

Fujitsu Laboratories Ltd., Kawasaki, Japan, "Fujitsu Develops Eye Tracking Technology," Oct. 2, 2012, 4 pages.

Huang, Weidong, Handbook of Human Centric Visualization, "Visual Analysis of Eye Tracking Data" Springer Link, http://link.wringer.com, Springer International Publishing AG, Jun. 25, 2013, 5 pages.

Yamada T., Gohshi S., Echizen I. (2013) "Enhancement of Method for Preventing Unauthorized Copying of Displayed Information Using Object Surface Reflection," The International Workshop on Digital Forensics and Watermarking 2012. Lecture Notes in Computer Science, vol. 7809. Springer, Berlin, Heidelberg.

Yamada T., Gohshi S., and Echizen I., "Preventing Unauthorized Copying of Displayed Information by Utilizing Differences in Spectral Sensitivity Between Humans and Imaging Devices," 2012 IEEE International Workshop on Information Forensics and Security (WIFS), Tenerife, 2012, pp. 145-150.

Gao Z., Zhai G., Zhou J., Min X. and Hu C., "Information Security Display Via Uncrowded Window," 2014 IEEE Visual Communications and Image Processing Conference, Valletta, 2014, pp. 454-457.

* cited by examiner

AUTOMATIC ADJUSTMENT OF A DISPLAY TO OBSCURE DATA

TECHNICAL FIELD

The present disclosure generally relates to computer systems and, more particularly, to protecting sensitive data displayed by a computing device.

BACKGROUND

The use of computing devices has become widespread throughout society. For example, many users carry one or more devices, such as smart phones, smart watches, laptops, and tablets at any given time. Further, computing devices have become increasingly important in the personal lives of users. For example, users can communicate with family and friends, purchase goods and services, and access various personal and work-related data virtually anywhere using smart phones, smart watches, and other portable devices.

In a related trend, corporate workspaces have become increasingly smaller and collaborative. For example, users may share a common workspace lacking walls, dividers, and other protections to safeguard privacy. As such, many users access personal and confidential data both in public and at work with little or no privacy. As a result, sensitive data may be unintentionally displayed to an untrusted or unauthorized individual, for example, when a user performs activities using a device or temporarily turns their attention elsewhere.

BRIEF DESCRIPTION OF THE DRAWINGS

Various examples of the present disclosure will be understood more fully from the detailed description given below and from the accompanying drawings of various examples of the disclosure. In the drawings, like reference numbers may indicate identical or functionally similar elements. The drawing in which an element first appears is generally indicated by the left-most digit in the corresponding reference number.

DETAILED DESCRIPTION

Systems, methods, and computer program products are disclosed for automatic adjustment of a display to obscure application data.

In an example, a user operates a computing device in a location with little privacy or protection to prevent others from viewing the user's data. To protect the user's data, a data obscuring system automatically obscures sensitive data displayed by the user's computing device.

In an example, a data obscuring system receives and tracks eye data, head data, and/or facial data of a user as the user operates a computing device. The data obscuring system then analyzes the data collected from the user to determine whether eyesight of the user is on a display of the computing device. The data obscuring system presents the data on the display of the computing device when it determines the user's eyesight is on the display. However, the data obscuring system automatically adjusts presentation of the display to obscure the data when it determines that the user's eyesight is not focused on the display. The data obscuring system removes obscuring applied to the display when the user's eyesight returns to the display and continually adjusts the display accordingly throughout the remainder of the user's session.

Accordingly, aspects of the present disclosure provide novel features to prevent unauthorized and inadvertent disclosure of sensitive data on one or more displays of a computer system.

Figure 1:
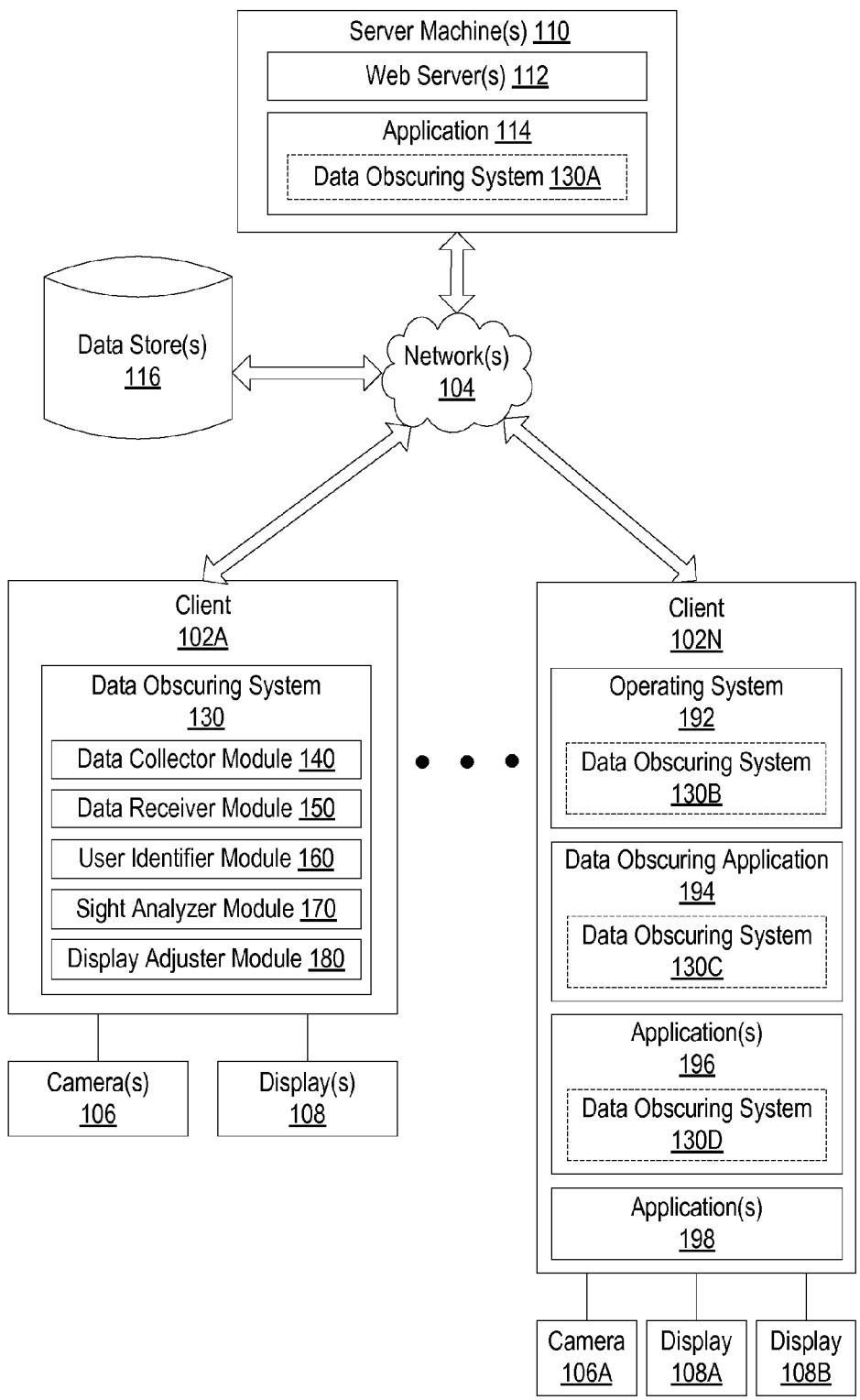
FIG. 1 is a block diagram illustrating a system architecture, in accordance with various examples of the present disclosure.

FIG. 1 illustrates an exemplary system architecture 100 in which examples of the present disclosure may be implemented. System architecture 100 includes server machine(s) 110, data store(s) 116, and client machines 102A-102N connected to one or more network(s) 104. Network(s) 104 may be public networks (e.g., the Internet), private networks (e.g., local area networks (LANs) or wide area networks (WANs)), or any combination thereof. In an example, network(s) 104 may include the Internet and/or one or more intranets, wired networks, wireless networks, and/or other appropriate types of communication networks. In one example, network(s) 104 may comprise wireless telecommunications networks (e.g., cellular phone networks) adapted to communicate with other communication networks, such as the Internet.

Data store 116 is persistent storage capable of storing various types of data, such as text, audio, image, and video content. In some examples, data store 116 might be a network-attached file server, while in other examples data store 116 might be some other type of persistent storage such as an object-oriented database, a relational database, and so forth.

Client machines 102A-102N may be personal computers (PC), laptops, mobile phones, tablet computers, server computers, wearable computing devices, or any other type of computing device. Client machines 102A-102N may run an operating system (OS) that manages hardware and software of the client machines 102A-102N. A browser (not shown) may run on the client machines 102A-102N (e.g., on the OS of the client machines). The browser may be a web browser that can access content and services provided by a web server 120 of server machine 110. Other types of computer programs and computer scripts also may run on client machines 102A-102N.

Client machine 102A includes one or more camera(s) 106, one or more display(s) 108, and data obscuring system 130. Data obscuring system 130 includes data collector module 140, data receiver module 150, user identifier module 160, sight analyzer module 170, and display adjuster module 180. In an example, a data obscuring system 130, 130A, 130B, 130C, 130D may include one or more of a data collector module 140, a data receiver module 150, a user identifier module 160, a sight analyzer module 170, and a display adjuster module 180. In some examples, functionality associated with data collector module 140, data receiver module 150, user identifier module 160, sight analyzer module 170, and display adjuster module 180 may be combined, divided, and organized in various arrangements on one or more computing devices.

In an example, client machine 102A is coupled to one or more camera(s) 106, is coupled to one or more display(s) 108, and includes data obscuring system 130. For example, client machine 102A may be directly or wirelessly (e.g., via Bluetooth) connected to one or more camera(s) 106 and one or more display(s) 108. Camera(s) 106 may include one or more external cameras (e.g., attached webcams) or one or more cameras that are embedded, incorporated, or built into a computing device (e.g., personal computer, laptop, smartphone, smart glasses, various types of wearable computing devices, etc.).

A camera generally describes an optical instrument that records images or other visual data for storage and/or transmission to other locations. In an example, one or more cameras 106 perform eye tracking to measure eye activity and/or eye positioning of a user operating client machine 102A. For example, eye tracking data may be collected using a local or head-mounted eye tracker coupled to client machine 102A.

In an example, an eye tracking device includes a camera 106 and a light source (e.g., infrared or other light) directed onto one or more eyes of a user. A camera 106 may track the reflection of the light source and ascertainable ocular features of an eye, such as a pupil. The eye data of the user then may be used to extrapolate rotation of a user's eye and the direction of the user's line of sight or gaze.

A display 108 generally refers to an output device for presenting various types of information to a user in a digital format. For example, various types of two-dimensional displays include, television sets, computer monitors, head-mounted displays, broadcast reference monitors, medical monitors, etc. Three-dimensional displays may include stereoscopic projections, laser displays, holographic displays, tactile electronic displays, etc.

In an example, data collector module 140 of data obscuring system 130 tracks and collects eye movement data and other eye data from a user. In one example, data collector module collects biometric eye data identifying a user. For example, data collector module 140 may collect iris scan data, pupil scan data, retinal scan data and other types of eye data from a user. In some examples, data collector module 140 collects head and facial data for a user. For example, data collector module 140 may collect data about head and/or or facial positioning of a user. Data collector module 140 also may collect facial recognition data from a user, for example, to identify the user in a current or future session.

In an example, data receiver module 150 of data obscuring system 130 receives data collected from a user or from a device worn by the user. For example, data receiver module 150 may receive eye data collected from a user by a camera 106 associated with an eye tracking device. In some examples, data receiver module 150 receives various types of eye data from a user, including biometric eye data identifying the user. In addition, data receiver module 150 may receive data about the positioning of a user's head and/or face in relation to one or more displays.

In an example, user identifier module 160 of data obscuring system 130 determines whether to allow a user of a client machine 102A to view data presented on one or more displays 108A, 108B. For example, user identifier module 160 may determine whether to login a user on client machine 102A, to lock or unlock client machine 102A, to present data on a display 108 to a user, or to obscure data presented on a display 108 based on eye data and/or facial data collected from the user.

In an example, user identifier module 160 automatically locks client machine 102A or logs a user off client machine 102A when eye data is not received from the user within a predetermined amount of time. In some examples, user identifier module 160 automatically adjusts a user profile on client machine 102A in response to identifying a user based on eye data and/or facial data. For example, user identifier module 160 may adjust a user profile used on client machine 102A based on parental settings or the security classifications associated with the detected user of the client machine 102A based on eye data and/or facial recognition data.

In an example, user identifier module 160 authenticates a user seeking to use client machine 102A and/or to view data presented or ready for presentation on a display 108 based on eye data and/or facial data. For example, user identifier module 160 may compare data points, signatures, or patterns of eye data and/or facial data of a user to a database of trusted and/or untrusted user profiles when authenticating or authorizing a user.

In an example, sight analyzer module 170 of data obscuring system 130 analyzes eye data and/or facial data from a user to determine whether the user's visual orientation, visual perspective, direction of sight, gaze, or line of sight is on one or more displays 108A, 108B. For example, sight analyzer module 170 may detect various changes and perform various calculations involving eye data and/or facial data of a user to determine whether eyesight of the user is on one or more displays 108A, 108B.

In an example, sight analyzer module 170 determines whether eyesight of a user is directed towards or aligned with a display 108 based on a calculated line of sight for the user in reference to position and size of the display 108. Sight analyzer module 170 also may determine whether eyesight of a user is focused on an application on a display 108 based on characteristics of the display 108A and positioning of the application on the display.

In an example, display adjuster module 180 of data obscuring system 130 automatically adjusts presentation of data on one or more displays 108A, 108B based on whether eyesight of a user is determined to be on a respective display 108A, 108B. In one example, display adjuster module 180 automatically presents data on a display 108 to a user when eyesight of the user is determined to be on the display 108A. In addition, display adjuster module 180 automatically obscures presentation of the data on the display 108A when eyesight of the user is determined to be off the display 108A (e.g., when the user is not looking at the display 108A).

Client machine 102N includes camera 106A, display 108A, display 108B, data obscuring system 130B, data obscuring system 130C, data obscuring system 130D, operating system 192, data obscuring application 194, application(s) 196, application(s) 198.

In an example, a data obscuring system 130B, 130C, 130D uses camera 106A to perform eye tracking and to collect eye data from a user. For example, camera 106A may track a user's eye movement, collect eye position data from the user, collect eye movement data from the user, and/or collect biometric eye data from the user client machine 102N. In an example, biometric eye data may include optical data that identifies the user. For example, biometric eye data may include iris scan data, pupil scan data, retinal scan data, etc.

In an example, a data obscuring system 130B, 130C, 130D automatically adjusts one or more displays 108A, 108B based on eye data, facial data, head data and/or other data collected from a user. For example, a data obscuring system 130B, 130C, 130D may present data on one or more displays 108A, 108B to a user when it is determined that the eyesight of the user is on one or more of the respective displays 108A, 108B. Eyesight of a user generally refers to a user's visual orientation, visual perspective, direction of sight, gaze, or line of sight as it pertains to a hypothetical or real target, such as a display 108A, 108B. A user's eyesight may be determined by analyzing eye data and/or other types of data collected from a user.

In an example, a data obscuring system 130B, 130C, 130D automatically adjusts one or more displays 108A, 108B to obscure data based on eye data collected from a user. For example, a data obscuring system 130B, 130C, 130D may obscure data presented on one or more displays 108A, 108B when it is determined that eyesight of the user is off a respective display 108A, 108B.

In an example, a data obscuring system 130B, 130C, 130D presents data on a first display 108A and obscures data on a second display 108B in a dual display configuration when the user looks at the first display and not the second display. Data obscuring system 130B, 130C, 130D then automatically obscures presentation of the data on the first display 108A and removes obscuring of the data on the second display 108B when it is determined that the user's eyesight has moved from the first display 108A to the second display 108B in the dual monitor configuration.

Obscuring generally refers to one or more actions that remove data from being presented on a display 108A, 108B and/or render data presented on a display 108A, 108B as unreadable or indecipherable. For example, obscuring data may be performed by minimizing an application, closing an application, hiding data, moving an application to the background, redacting data, blurring all or part of an application or display, running a screensaver, displaying a protective image over the data, turning off a display, and/or distorting or rendering material presented on a display as unidentifiable or not viewable.

In an example, a data obscuring system 130B is provided as part of an operating system 192. For example, a data obscuring system 130B provided with operating system 192 may allow a user or computer system administrator to select or predetermine which of one or more software applications 196, 198 running on the operating system 192 to obscure when eyesight of the user moves off a display 108A, 108B.

For example, a software application 196, 198 developer and/or a computer system administrator may register or identify a software application 196, 198 to be obscured. In addition, a user may register or tag application 196, 198 windows, uniquely identified by application window IDs, to be obscured by a data obscuring system 130B, 130C. In some examples, a user may tag a software application 196, 198 or window using a keyboard shortcut. For example, one type of keyboard shortcut may tag a software application 196, 198 or window (e.g., a web browser window) to be obscured for the remainder of a session. Another type of keyboard shortcut may allow a user to select obscuring of a software application 196, 198 or window for current and future sessions until otherwise indicated.

In an example, a data obscuring system 130C is provided as part of data obscuring application 194. For example, a data obscuring application 194 installed and running on an operating system 192 may allow a user or computer system administrator to select or predetermine which of one or more software applications 196, 198 obscure when eyesight of the user is off a display 108A, 108B. In one example, a data obscuring application 194 provides an application programming interface (API) that allows other software applications 196, 198 to perform obscuring of displayed data.

In an example, a data obscuring system 130D is provided as part of one or more software application(s) 196. For example, a software developer may include data obscuring system 130D functionality within a software application 196 to allow a user or a computer system administrator to select or predetermine whether an application 196 or specific sensitive/private data within the application 196 is to be obscured when eyesight of the user is off the display 108A, 108.

In some examples, data obscuring system 130D functionality is predetermined and not configurable by a user or computer system administrator. For example, a software application 196 may be designed by an application developer to provide configurable or non-configurable obscuring for various application data and graphical user interface controls (e.g., labels, buttons, menus, lists, drop downs, windows, tabs, dialogues, panels, tables, graphics, etc.).

In an example, various software application(s) 198 do not have or use a data obscuring system (e.g. data obscuring system 130). In some examples, software application(s) 198 without a data obscuring system may be obscured or have application 198 data obscured, for example, by an operating system 192 data obscuring system 130B and/or a data obscuring system 130C of a data obscuring application 194.

Server machines 110 may include one or more web server(s) 120. Web server(s) 120 may provide text, audio, and video images from data store(s) 116 to client machines 102A-102N. Web server(s) 120 also may provide web-based application services, business logic, and/or updates to client machines 102A-102N. Client machines 102A-102N may locate, access, and consume various forms of content and services from web server(s) 120 using applications, such as a web browser, web servers, application servers, computer programs, etc. Web server(s) 120 also may receive text, audio, video, and image content from clients 102A-102N saved in data store(s) 116 for purposes that may include preservation and distribution of content.

In an example, a web server 120 is coupled to one or more applications servers (not shown) that provide application 114 services, data, and/or APIs to client machines 102A-102N. In one example, web server(s) 120 may provide clients 102A-102N with access to one or more application 114 services associated with a server-based data obscuring system 130A. Such functionality also may be provided, for example, as part of one or more different web applications, standalone applications, systems, plug-ins, web browser extensions, and application programming interfaces (APIs). In some examples, plug-ins and extensions also may be referred to, individually or collectively, as "add-ons."

In an example, some client machines 102A-102N may include applications associated with a service provided by server machine 110. In one example, one or more device types (e.g., smart phones, smart televisions, tablet computers, wearable devices, smart home computer systems, etc.) may use applications to access content provided by, to issue commands to server machine(s) 110, and/or to receive content from server machine(s) 110 without visiting or using web pages.

In an example, functions performed by server machine(s) 110 and/or web server(s) 120 also may be performed by the client machines 102A-102N, in whole or in part. In addition, the functionality attributed to a particular component may be performed by different or multiple components operating together. Further, server machine(s) 110 may be accessed as a service provided to other systems or devices via appropriate application programming interfaces (APIs), and thus are not limited to use with websites.

Figure 2:
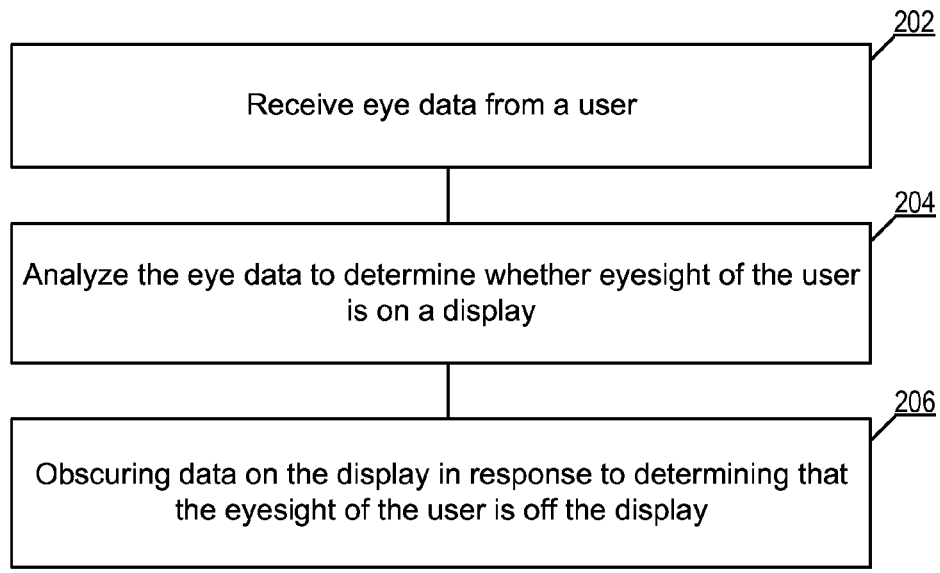
FIG. 2 is a flow diagram for automatically adjusting a display to obscure application data, according to an example of the present disclosure.

FIG. 2 is a flow diagram for automatically adjusting a display to obscure application data, according to an example of the present disclosure. The method 200 may be performed by processing logic that may comprise hardware (circuitry, dedicated logic, programmable logic, microcode, etc.), software (such as instructions run on a general purpose computer system, dedicated machine, or processing device), firmware, or a combination thereof.

Method 200 begins at block 202 when data receiver module 150 of data obscuring system 130 receives eye data from a user. In an example, data receiver module 150 receives eye data from one or more cameras 106 associated with an eye tracking device. For example, data receiver module 150 may receive eye position, eye movement, and other eye tracking data from an eye tracking device. Data receiver module 150 also may receive biometric eye data, such as iris scan data, pupil scan data and retinal scan data that identifies a user. In some examples, data receiver module 150 receives head position data, facial position, and/or facial recognition data collected from a user.

At block 204, sight analyzer module 170 of data obscuring system 130 analyzes the eye data received from the user to determine whether eyesight of the user is on a display 108. In an example, sight analyzer module 170 determines whether eyesight of a user is directed towards or aligned with a display 108 based on a calculated line of sight for the user in reference to position and size of the display 108. Sight analyzer module 170 also may determine whether eyesight of a user is on an application presented within a display 108 area based on characteristics of the display 108A area and positioning of the application within the display area.

In an example, sight analyzer module 170 detects a change in eyesight of a user. For example, sight analyzer module 170 may detect a change in eyesight of a user based on updated eye data received from the user. In one example, sight analyzer module 170 performs eye data and eyesight analysis to determine and/or re-determine whether the eyesight of the user is on one or more displays 108A, 108B.

At block 206, display adjuster module 180 of data obscuring system 130 obscures data on the display in response to determining that the eyesight of the user is off the display 108. In an example, display adjuster module 180 secures some or all of data presented on a display 108 in response to detecting that eyesight of the user is not focused on the display 108.

In an example, display adjuster module 180 obscures presentation of data on a display 108 by obscuring an entire display 108. Display adjuster module 180 also may obscure one or more applications 196, 198 presented on the display 108 and/or one or more areas of data presented on the display, for example, the areas comprising sensitive, private, and/or confidential data provided by applications 196, 198. In some examples, display adjuster module 180 obscures data presented on a display in real-time or substantially in real-time (e.g., under a second, under a tenth of a second, under one hundredth of a second, etc.)

In an example, display adjuster module 180 obscures web browser software applications and data presented on a display 108 in response to determining that eyesight of a user off the display 108. For example, a web browser may include its own data obscuring system 130D or use a data obscuring application 194 available on a client machine 102A to obscure web browser windows, tabs, data, etc.

In an example, a web browser plug-in obscures web browser applications and data. For example, a web browser plug-in may receive data that it uses to determine whether to obscure web browser applications and data. In one example, an application developer may code web application using custom tags and/or scripts that mark web application data as sensitive, indicating to a web browser or a web browser plug-in that the web application data is to be obscured. In some examples, a web browser and/or a web browser plug-in also may dynamically inject code into a webpage, for example during rendering of the webpage, to perform the obscuring (e.g., custom HTML, dynamic HTML, JavaScript, etc.).

In some examples, data obscuring system 130 uses other types of detected information in addition to eye data and eyesight analysis. For example, data obscuring system 130, may present data on a display to a user without performing obscuring when detecting sole presence of the user, when detecting presence of trusted users, and/or when detecting absence of untrusted users in an area, space (e.g., room), or within viewing distance of a display 108. Thus, a display 108 or content presented on a display 108 may remain visible (no obscuring) when there is a low or nonexistent risk of an unwanted (e.g., unknown, untrusted, unauthorized) user viewing a display 108 or presented data.

In some examples, data obscuring system 130 may perform obscuring when detecting that an individual (e.g., a known individual, an unknown individual, a trusted individual, an untrusted individual, etc.) other than a user has entered a location, is about to enter a location, is within viewing distance of a display 108, or is about to be within viewing distance of a display 108. In some examples, data obscuring system 130 determines whether a detected individual other than a user is authorized to view one or more portions of content presented on a display 108 and may obscure one or more parts of the content that the detected individual is unauthorized to view (e.g., sensitive data, private data, classified data, etc). On the other hand, when the individual is authorized to view the content (e.g., a co-worker or boss viewing a presentation), the content may remain visible (i.e., with no obscuring applied, "unobscured") even when eyesight of the user is detected as being off a display 108 (e.g., when the user looks away, at another display, or at paper notes).

Figure 3:
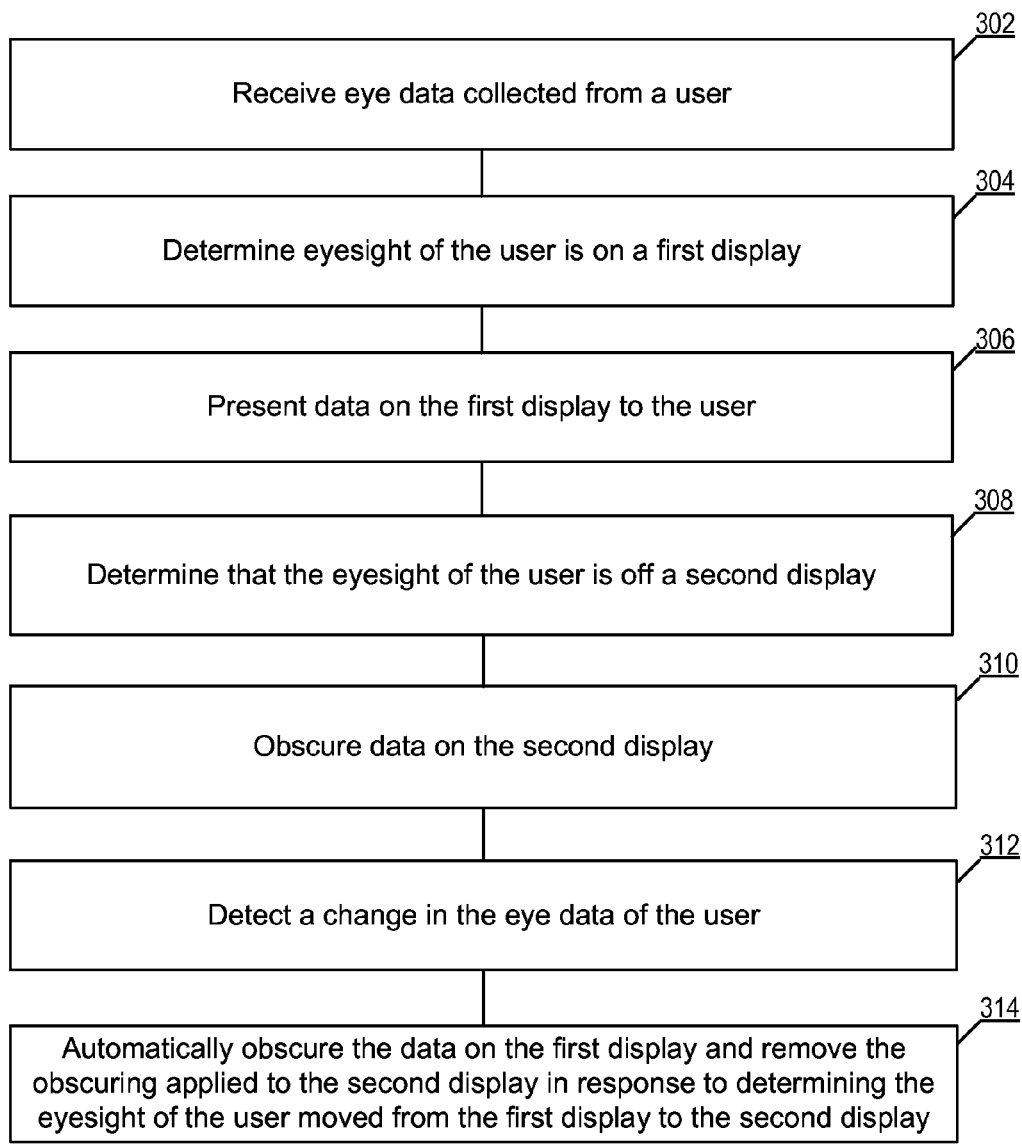
FIG. 3 is a flow diagram for automatically adjusting multiple displays to obscure application data, according to an example of the present disclosure.

FIG. 3 is a flow diagram for is a flow diagram for automatically adjusting multiple displays to obscure application data, according to an example of the present disclosure. The method 300 may be performed by processing logic that may comprise hardware (circuitry, dedicated logic, programmable logic, microcode, etc.), software (such as instructions run on a general purpose computer system, dedicated machine, or processing device), firmware, or a combination thereof.

Method 300 begins at block 302 when data receiver module 150 of data obscuring system 130 receives eye data collected from a user. In an example, data receiver module 150 receives eye data from one or more cameras 106. For example, data receiver module 150 may receive eye position data, eye movement data, and other eye tracking data from an eye tracking device or other type of computing device. Data receiver module 150 also may receive biometric eye data (e.g., iris data, pupil data, retinal data) identifying a user. In some examples, data receiver module 150 receives head position data, facial position data, and/or facial recognition data collected from a user.

At block 304, sight analyzer module 170 of data obscuring system 130 determines that eyesight of a user is on a first display 108A. For example, sight analyzer module 170 may use one or more of eye data, head data, facial data, or other types of data collected from a user to determine that the user's focus is on the first display 108A. In one example, sight analyzer module 170 determines that eyesight of the user is on the first display 108A based on eye data of the user in relation to a size and position of the first display 108A.

At block 306, display adjuster module 180 of data obscuring system 130 presents data on the first display 108A to a user. In an example, display adjuster module 180 allows the regular, non-obscured presentation of data on the first display 108A when the eyesight of the user is determined to be directed towards or focused on the first display 108A. In one example, display adjuster module 180 restores presentation of data on the first display 108A by removing obscuring previously applied to the first display 108A. For example, display adjuster module 180 may remove obscuring from the first display 108A when the eyesight of the user returns to the first display 108A after being directed towards another location.

At block 308, sight analyzer module 170 of data obscuring system 130 determines that eyesight of a user is off the first display 108A. In an example, sight analyzer module 170 determines that the direction or focus of the user's eyesight has moved to a location that is not on the first display 108A. For example, sight analyzer module 170 may determine that the eyesight of the user is off the first display 108A based on eye data, head data, and/or facial data collected from the user in relation to a size and position data associated with the first display 108A.

At block 310, display adjuster module 180 of data obscuring system 130 obscures data on the second display 108B in response to determining that the eyesight of the user is off the second display 108B. In an example, sight analyzer module 170 adjusts presentation of the data on the second display 108B by obscuring the data.

For example, sight analyzer module 170 may remove the data from the second display 108B or alter presentation of the data on the second display 108B by making the data unreadable or indecipherable. In some examples, data obscuring system may obscure data by minimizing an application, closing an application, hiding data, moving an application to the background, redacting data, blurring all or part of an application or display, running a screensaver, displaying a protective image on a display over the data, turning off a display, and/or distorting or rendering material presented on a display as unidentifiable or not viewable.

At block 312, sight analyzer module 170 of data obscuring system 130 detects a change in the eye data of the user. In an example, sight analyzer module 170 compares updated eye data from a user to previous eye data received from the user to detect the change. Sight analyzer module 170 also may detect a change in one or more other types of user data, such as head data, facial data, etc. In one example, sight analyzer module 170 calculates or recalculates a user's line of sight in response to detecting a change in eye data, head data, and/or facial data of a user.

At block 314, display adjuster module 180 of data obscuring system 130 automatically obscures the data on the first display 108A and removes the obscuring from the second display 108B in response to determining that the eyesight of the user transitioned from the first display 108A to the second display 108B. In an example, display adjuster module 180 dynamically applies obscuring to and removes the obscuring from one or more displays 108A, 108B based on whether the user's eyesight is directed toward a respective display 108A, 108B. In one example, display adjuster module 180 obscures the presentation of data on both the first display 108A and the second display 108B when user's eyesight is off both displays.

Figure 4:
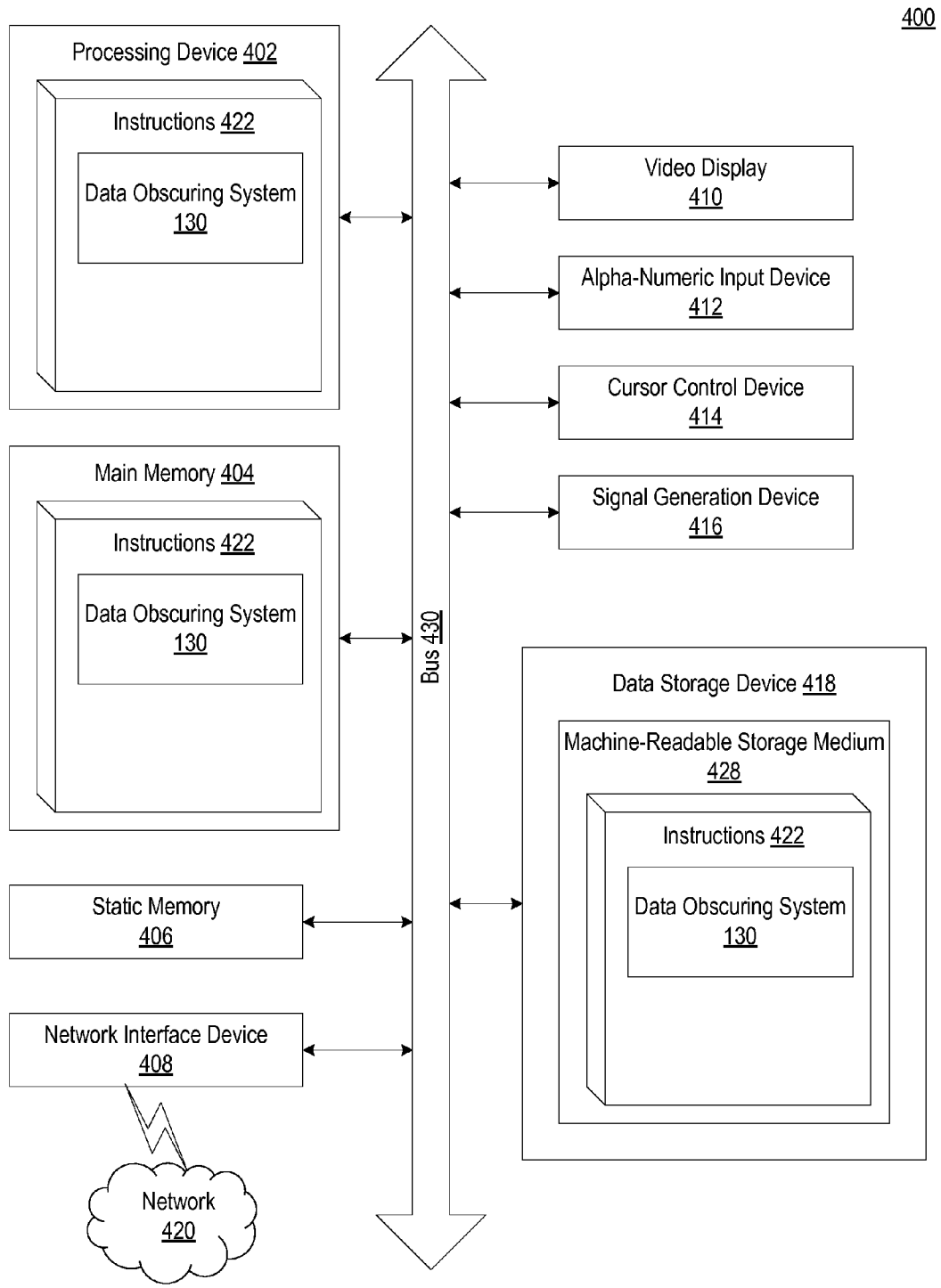
FIG. 4 is a block diagram of an exemplary computer system that may perform one or more of the operations described herein.

FIG. 4 illustrates a diagram of a machine in the exemplary form of a computer system 400, within which a set of instructions for causing the machine to perform any one or more of the methodologies discussed herein may be executed. In other examples, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a wearable computing device, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device (processor) 402, a main memory 404 (e.g., read-only memory (ROM), flash memory, dynamic random access memory (DRAM) such as synchronous DRAM (SDRAM), double data rate (DDR SDRAM), or DRAM (RDRAM), etc.), a static memory 406 (e.g., flash memory, static random access memory (SRAM), etc.), and a data storage device 418, which communicate with each other via a bus 430.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 also may be one or more special-purpose processing devices such as an application specific integrated circuit (ASIC), a field programmable gate array (FPGA), a digital signal processor (DSP), network processor, or the like. The processor 402 is configured to execute instructions 422 for performing the operations and steps discussed herein.

The computer system 400 also may include a network interface device 408. The computer system 400 may further include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-readable storage medium 428 on which is stored one or more sets of instructions 422 (e.g., software computer instructions) embodying any one or more of the methodologies or functions described herein. The instructions 422 also may reside, completely or at least partially, within the main memory 404 and/or within the processor 402 during execution thereof by the computer system 400, the main memory 404 and the processor 402 also constituting computer-readable storage media. The instructions 422 may be transmitted or received over a network 420 via the network interface device 408.

In one example, the instructions 422 include instructions for one or more modules of a data obscuring system (e.g., data obscuring system 130 of FIG. 1) and/or a software library containing methods that call an automated data obscuring system 130. While the computer-readable storage medium 428 (machine-readable storage medium) is shown as an example to be a single medium, the term "computer-readable storage medium" should be taken to include a single medium or multiple media (e.g., a centralized or distributed database, and/or associated caches and servers) that store the one or more sets of instructions. The term "computer-readable storage medium" also may include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Numerous details are set forth in the foregoing description. However, it will be apparent to one of ordinary skill in the art having the benefit of this disclosure that the present disclosure may be practiced without these specific details. In some instances, well-known structures and devices are shown in block diagram form, rather than in detail, to avoid obscuring the present disclosure.

Some portions of the detailed description have been presented in terms of algorithms and symbolic representations of operations on data bits within a computer memory. Here, an algorithm is generally conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing", "capturing", "determining", "obscuring", "providing", "receiving," "processing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other examples will be apparent to those of skill in the art upon reading and understanding the above description. The scope of the disclosure therefore should be determined with reference to the appended claims, along with the full scope of equivalents to which such claims are entitled.

What is claimed is:

1. A computer system, comprising:
   a non-transitory memory; and
   one or more hardware processors coupled to the non-transitory memory and configured to read instructions from the non-transitory memory to cause the computer system to perform operations comprising:
   receiving, by a first application executing on the computer system, eye data collected from a user;
   receiving, by the first application, an indication of an event involving a user interaction with a second application executing on the computer system, the first application and the second application being different computer programs;
   modifying, by the first application, a privacy setting associated with the second application based on receiving the indication of the event involving the user interaction with the second application;
   determining, by the first application, whether eyesight of the user is on a display based on the eye data and one or more attributes of the display;
   determining, by the first application, whether to obscure application data of the second application based on the modified privacy setting associated with the second application;
   injecting, by the first application, external code into the second application to obscure the application data of the second application based on the modified privacy setting, wherein the first application dynamically injects the external code into the second application while the second application is executing on the computer system; and
   causing, by the first application, obscuring of the application data of the second application on the display using the injected code, at least in part, based on determining that the eyesight of the user is off of the display.

2. The computer system of claim 1, wherein the obscuring is further based on detecting presence of another person.

3. The computer system of claim 1, wherein the obscuring is further based on determining that the display is viewable by another person.

4. The computer system of claim 1, wherein the operations further comprise:
   collecting head data from the user; and
   wherein the obscuring is further based on, at least in part, the head data collected from the user.

5. The computer system of claim 1, wherein the operations further comprise:
   collecting facial data from the user; and
   wherein the obscuring is further based on, at least in part, the facial data collected from the user.

6. The computer system of claim 1, wherein the operations further comprise:
   determining whether the eyesight of the user is on the display, at least in part, based on facial data and head data collected from the user.

7. The computer system of claim 1, wherein the modifying involves associating a unique identifier of the second application with the privacy setting.

8. The computer system of claim 1, wherein the privacy setting is modified for a current user session associated with the second application.

9. The computer system of claim 1, wherein one or more cameras collect the eye data from the user.

10. The computer system of claim 1, wherein the operations further comprise:

analyzing the eye data to determine whether the eyesight of the user is on the display.

11. The computer system of claim 1, wherein the operations further comprise:
   determining that the eyesight of the user is on the display based on the eye data from the user.

12. The computer system of claim 1, wherein the operations further comprise:
   obscuring, by the first application, second application data associated with a third application, at least in part, based on determining that the eyesight of the user is off of the display.

13. The computer system of claim 1, wherein the operations further comprise:
   obscuring the data on a second display at least in part based on determining that the eyesight of the user is not directed towards the second display and the modified privacy setting indicates that the application data is to be obscured.

14. The computer system of claim 13, wherein the display and the second display are configured in a dual display configuration.

15. The computer system of claim 1, wherein the operations further comprise:
   analyzing the eye data in view of a size and position of the display.

16. The computer system of claim 1, wherein the first application is an operating system.

17. The computer system of claim 1, wherein the obscured application data on the display is based on the event involving the user interaction with the second application.

18. The computer system of claim 1, wherein the second application is a web browser and a web browser plug-in associated with the first application injects the external code into the web browser.

19. A computer-implemented method, comprising:
   receiving, by a first application, eye data and facial data collected from a user;
   receiving, by the first application, an indication of an event involving a user interaction with a second application, the first application and the second application being different computer programs;
   modifying, by the first application, a privacy setting associated with the second application based on receiving the indication of the event involving the user interaction with the second application;
   analyzing, by the first application, the eye data and the facial data to determine whether sight of the user is directed towards a display based on a size and a position of the display;
   determining, by the first application, whether to obscure application data for the second application based on the modified privacy setting associated with the second application;
   injecting, by the first application, external code into the second application to obscure the application data of the second application based on the modified privacy setting, wherein the first application dynamically injects the external code into the second application while the second application is executing; and
   obscuring, by the first application, the application data of the second application on the display using the injected code at least in response to determining that the sight of the user is off of the display.

20. A non-transitory machine-readable medium having stored thereon machine-readable instructions executable to cause a machine to perform operations comprising:
   receiving, by a first application, eye data collected from a user;
   receiving, by the first application, an indication of an event involving a user interaction with a second application;
   modifying, by the first application, a privacy setting associated with the second application based on receiving the indication of the event involving the user interaction with the second application;
   analyzing, by the first application, the eye data to determine whether eyesight of the user is on a display based on a size and a position of the display;
   determining, by the first application, whether to obscure application data of the second application based on the modified privacy setting associated with the second application;
   injecting, by the first application, external code into the second application to obscure the application data of the second application based on the modified privacy setting, wherein the first application dynamically injects the external code into the second application while the second application is executing; and
   obscuring the application data of the second application on the display using the injected code at least in response to determining the eyesight of the user is directed away from the display.

\* \* \* \* \*